US008805424B2

United States Patent
King et al.

(10) Patent No.: US 8,805,424 B2
(45) Date of Patent: Aug. 12, 2014

(54) SMS OVER WIRELESS PACKET DATA NETWORK

(75) Inventors: William Chung King, Lafayette, CA (US); Priscilla Lau, Fremont, CA (US); Kwai Yeung Lee, San Jose, CA (US); Loc Ba Vo, Pleasant Hill, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1057 days.

(21) Appl. No.: 12/261,434

(22) Filed: Oct. 30, 2008

(65) Prior Publication Data

US 2010/0099443 A1    Apr. 22, 2010

Related U.S. Application Data

(60) Provisional application No. 61/106,515, filed on Oct. 17, 2008.

(51) Int. Cl.
    *H04W 4/00* (2009.01)
(52) U.S. Cl.
    USPC ........ 455/466; 455/435.1; 370/252; 370/328; 370/349; 370/496; 370/522
(58) Field of Classification Search
    USPC ........... 455/466; 370/328–338, 349, 496, 522
    See application file for complete search history.

(56) References Cited

U.S. PATENT DOCUMENTS

| | | | |
|---|---|---|---|
| 2005/0086541 A1* | 4/2005 | Rajaniemi | 713/202 |
| 2006/0104211 A1* | 5/2006 | Islam et al. | 370/252 |
| 2007/0249379 A1* | 10/2007 | Bantukul | 455/466 |
| 2007/0281717 A1* | 12/2007 | Bharadwaj | 455/466 |
| 2008/0014938 A1* | 1/2008 | Hart et al. | 455/435.1 |
| 2008/0146258 A1* | 6/2008 | Testone et al. | 455/466 |

OTHER PUBLICATIONS

Rosenberg et al. "SIP: Session Initiation Protocol", Network Working Group, RFC-3261, Jun. 2002, 269 pages.
Campbell, Ed., "Session Initiation Protocol (SIP) Extension for Instant Messaging", Network Working Group, RFC-3428, Dec. 2002, 18 pages.
TIA/EIA Standard, "Short Message Services for Wideband Spread Spectrum Systems", Jan. 2002, 122 pages.
$3^{rd}$ Generation Partnership Project 2 (3GPP2), "Cellular Radiotelecommunications Intersystem Operations", Version 1.0, Dec. 1997, (1492 pages).

* cited by examiner

*Primary Examiner* — Nick Corsaro
*Assistant Examiner* — Gerald Johnson

(57) ABSTRACT

A system may include one or more network devices. The one or more network devices may receive a short message service (SMS) message intended for an access terminal, embed the SMS message into a data message, determine whether a data session exists with the access terminal, the data session occurring over a data network, transmit the data message to the access terminal via the data network when the data session exists, and transmit the SMS message via a voice network when the data session does not exist.

22 Claims, 11 Drawing Sheets

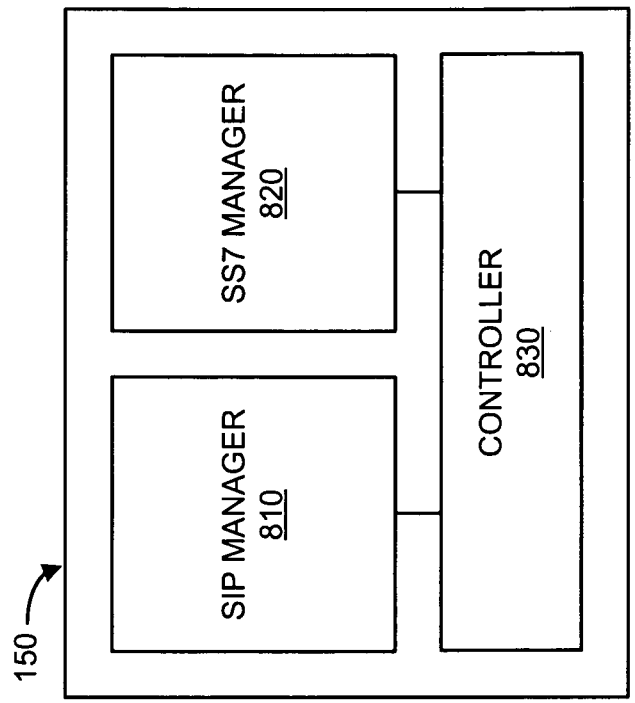
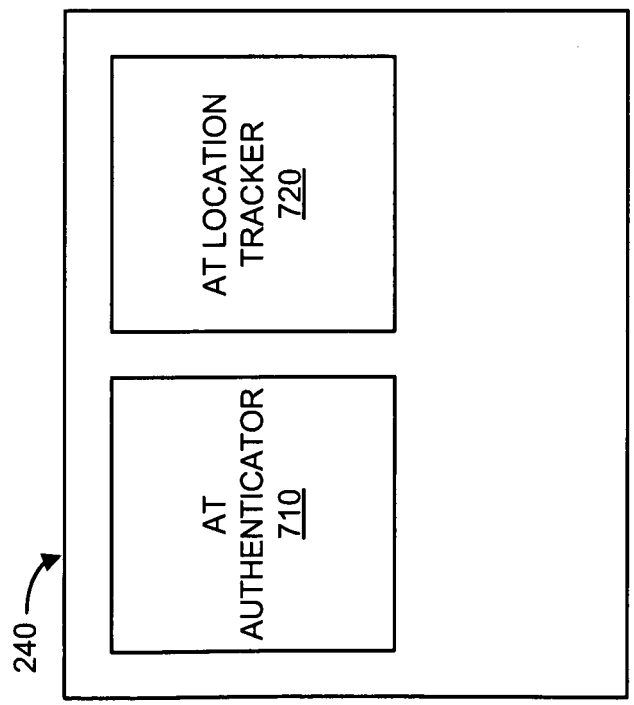
FIG. 8
FIG. 7

SMS OVER WIRELESS PACKET DATA NETWORK

RELATED APPLICATIONS

This application claims priority under 35 U.S.C. §119 based on U.S. Provisional Application No. 61/106,515, filed Oct. 17, 2008, the disclosure of which is incorporated by reference herein in its entirety.

BACKGROUND INFORMATION

Current short messaging services (SMS) offered by wireless operators share common network elements with voice traffic. Each SMS message can generates a call attempt at a mobile switching center (MSC) in the voice network, similar to a call attempt generated by a voice call. Thus, the same network resources are used for processing SMS messages as well as voice calls at the MSC. As more new applications using SMS continue to be offered, SMS traffic will increase. This increase will impact the MSC's ability to process voice calls.

BRIEF DESCRIPTION OF THE DRAWINGS

FIG. 7 provides a functional block diagram of the CSCF server of FIG. 2;

FIG. 8 provides a functional block diagram of the SMSC of FIG. 2;

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Figure 1:
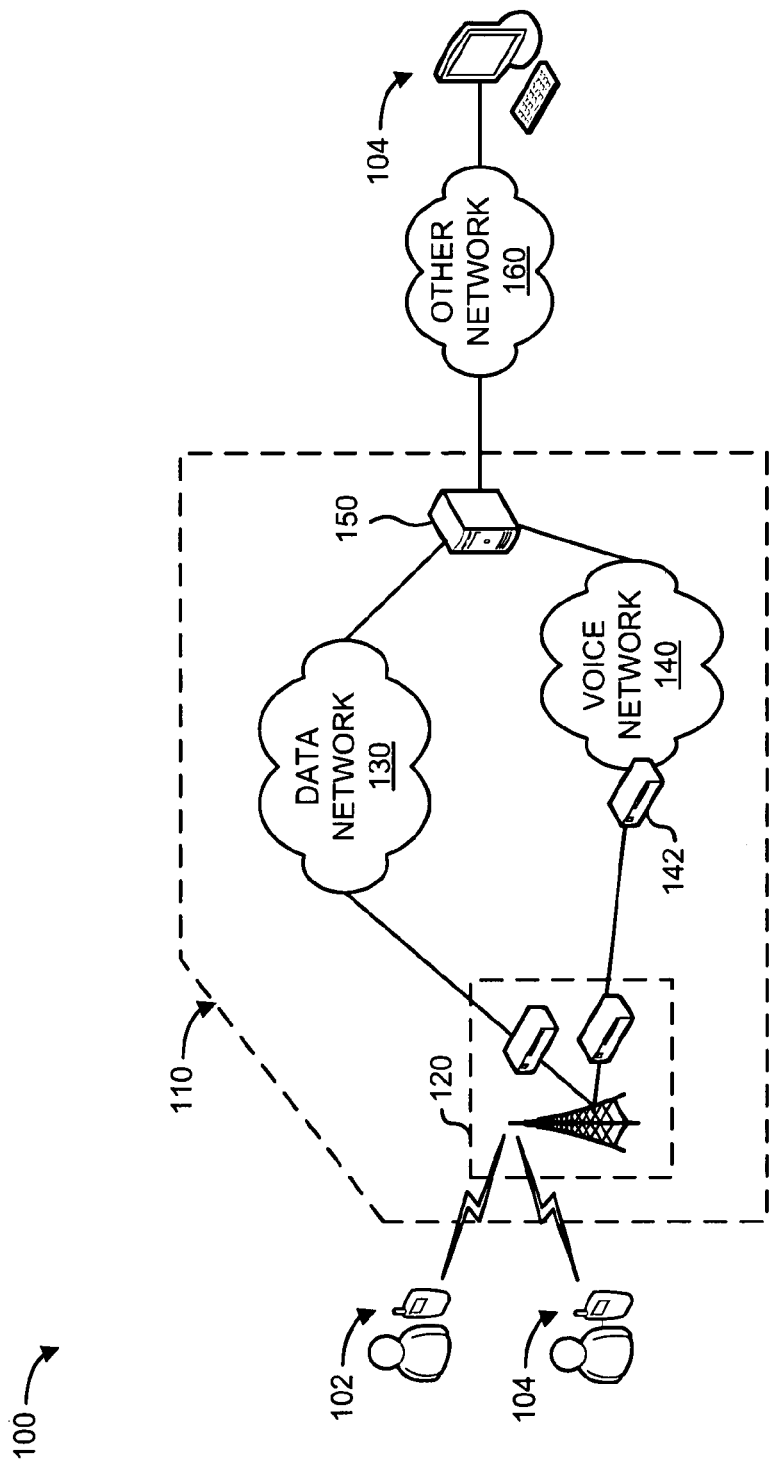
FIG. 1 depicts an exemplary network in which systems and methods described herein may be implemented.

Systems and/or methods described herein may permit delivery of Short Message Service (SMS) messages over a wireless packet data network. FIG. 1 depicts an exemplary network 100 in which concepts described herein may be implemented. As illustrated, network 100 may include an access terminal 102 and one or more other device(s) 104, interconnected by a wireless carrier network 110, and/or one or more other networks 160.

Access terminal 102 may include a device capable of transmitting and receiving data (e.g., voice, text, images, and/or multimedia data) over a wireless network. For example, access terminal 102 may include a handheld device, such as a cellular telephone, an Internet protocol (IP) telephone, a personal digital assistant (PDA); a portable game and/or music playing device; and/or a conventional laptop and/or palmtop receiver or other appliance that includes a radiotelephone transceiver with Mobile Internet Protocol (Mobile IP) capabilities. In one implementation, access terminal 102 may communicate via packet-based or non-packet-based wireless transmissions.

Other device(s) 104 may each include any type of device that is able to communicate via a network. For example, other device(s) 104 may include any type of device that is capable of transmitting and receiving data (e.g., voice, text, images, multimedia data) to/from a network. In an exemplary implementation, other device(s) 104 may include a mobile device similar to access terminal 102. In another exemplary implementation, other device(s) 104 may include a desktop computer or other fixed-location computing device. Other device (s) 104 may connect to network 160 via wired and/or wireless connections.

In one implementation, access terminal 102 and/or other device(s) 104 may include hardware or software based logic to maintain a TCP/IP-based messaging client (e.g., an SMS client application). Access terminal 102 and/or other device (s) 104 may each include one or more messaging clients (e.g., a SMS client, a MMS client, an e-mail client, etc.).

Wireless carrier network 110 may include a network that transfers information. Wireless carrier network 110 may include a radio access network (RAN) 120, a data network 130, a voice network 140, and a Short Message Service Center (SMSC) 150. Implementations of wireless carrier network 110 may include cellular networks and/or other types of wireless networks, such as ad hoc wireless networks, free-space optical networks, etc. Wireless carrier network 110 may send and/or receive information via packet-based or non-packet-based exchanges. In one implementation, wireless carrier network 110 may be operated by a service provider that provides wireless communication services to a customer, such as a user of access terminal 102 and/or other device(s) 104, as a managed service (e.g., for a monthly fee). Wireless carrier network 110 may send and/or receive encrypted information and/or unencrypted information.

RAN 120 may include a variety of components to facilitate mobile communications, such as antennas, base transceiver stations (BTS), base station controller (BSC), and/or interfaces for packet data servicing nodes (PDSNs) and/or mobile switching centers (MSCs), such as MSC 142.

Data network 130 may include components necessary to facilitate packet data traffic, including for example, one or more load balancers, gateways, and databases connected by a core infrastructure (not shown). A PDSN may serve as an access gateway to data network 130.

Voice network 140 may include elements to facilitate voice traffic and/or SMS traffic through voice network 140, such as a mobile switching center (MSC) 142, a home location register (HLR), a signal transfer point (STP), and Signaling System 7 (SS7) links within voice network 140.

SMSC 150 may include one or more devices for implementing SMS in a mobile telephone network, such as data network 130 and/or voice network 140. If a user (e.g., using access terminal 102) sends a text message (e.g., a SMS message) to another user (e.g., using one of other device(s) 104), the message may be received and forwarded by SMSC 150 to the destination user. SMSC 150 may generally be responsible for locating the destination user and submitting the message to the destination user.

Other network 160 may include one or more networks including another wireless network, a satellite network, the Internet, a telephone network, such as the Public Switched Telephone Network (PSTN), a metropolitan area network (MAN), a wide area network (WAN), a local area network (LAN), a mesh network, or another type of network. In an exemplary implementation, network 160 may include a combination of networks and other components (e.g., switches, routers, etc.) for transmitting data to and from access terminal 102, other device(s) 104, and/or SMSC 150.

Still referring to FIG. 1, some wireless operators may offer SMS over common network elements shared with voice traffic. Using, for example, American National Standard Institute (ANSI)-41 protocol, each SMS message passing through a voice network (such as voice network 140) can generate a call attempt at an MSC (such as MSC 142), similar to a call attempt generated by a voice call. In other words, the same network resources are used for processing SMS messages as well as voice calls.

Systems and/or methods described herein may permit delivery of Short Message Service (SMS) over a wireless packet data network, such as data network 130. Thus, systems and/or methods described herein may either eliminate SMS traffic on voice network 140/MSC 142 or (in some implementations) use voice network/MSC 142 as a back-up route for SMS traffic. Data network 130 may use any wireless communication standard, such as CDMA, GSM or Wireless Fidelity (WiFi). For purposes of simplicity and without limitation, implementations will be described herein in the context of a 1x Evolution-Data Optimized (1xEVDO) Packet Data Network and Session Initiated Protocol (SIP).

Although FIG. 1 shows exemplary components of network 100, in other implementations, network 100 may contain fewer, additional, different, or differently arranged components than depicted in FIG. 1. In still other implementations, one or more components of network 100 may perform one or more other tasks described as being performed by one or more other components of network 100.

Figure 2:
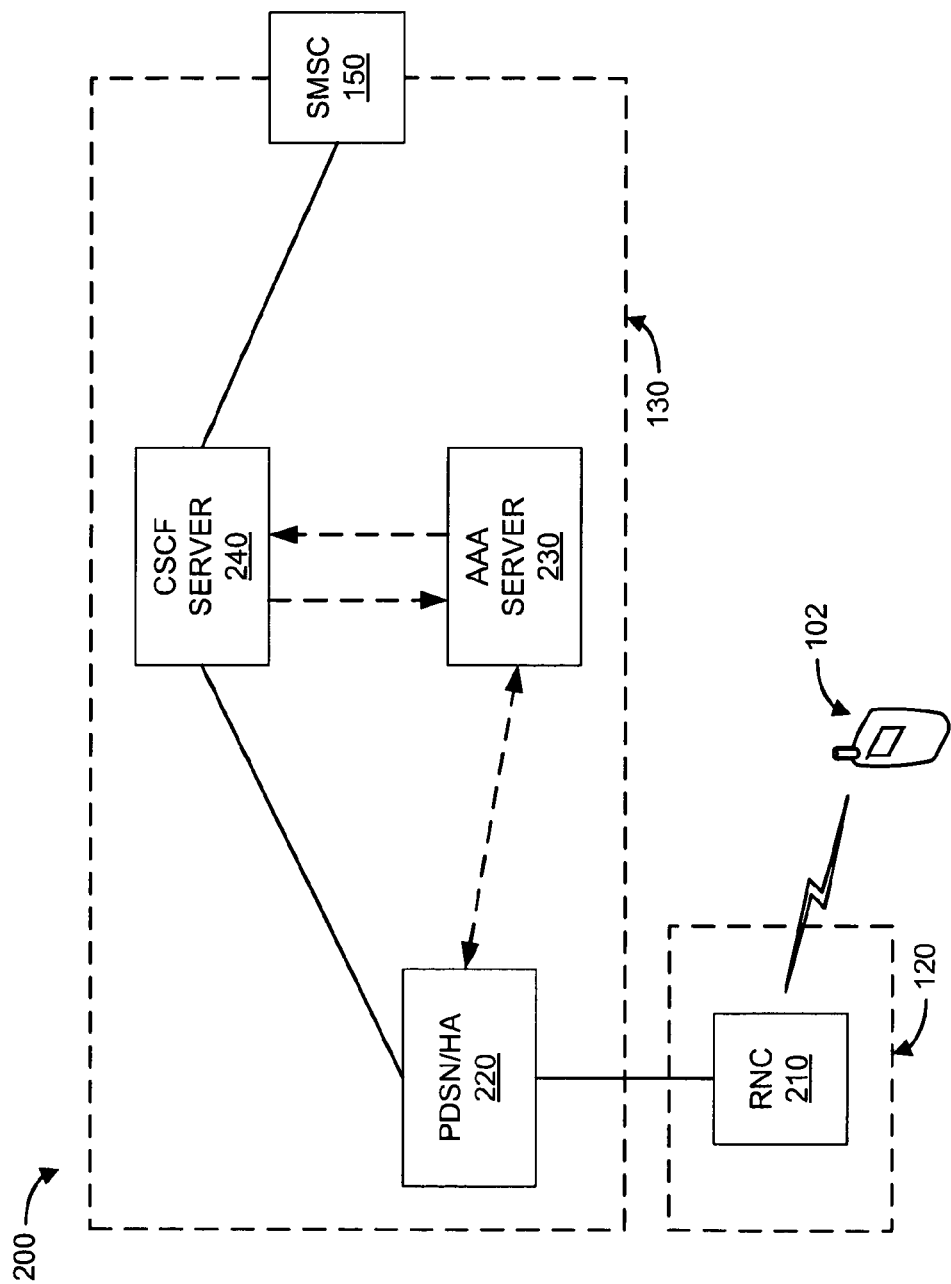
FIG. 2 provides an illustration of an exemplary network portion of the wireless carrier network of FIG. 1.

FIG. 2 provides an illustration of an exemplary network portion 200 of wireless carrier network 110. As illustrated, exemplary network portion 200 may include radio network controller (RNC) 210; packet data servicing node/home agent (PDSN/HA) 220; authentication, authorization, and accounting (AAA) server 230; call session control function (CSCF) server 240; and SMSC 150. In the exemplary implementation of FIG. 2, RNC 210 may be considered part of RAN 120, while PDSN/HA 220, AAA server 230, CSCF server 240, and SMSC 150 may be considered part of data network 130. Access terminal 102 and SMSC 150 may include the features described above in connection with, for example, FIG. 1.

Implementations described herein may use network portion 200 to provide SMS over data network 130. RNC 210 may provide radio access functions for access terminal 102 to connect to data network 130. RNC 210 may also provide an interface to data network 130 for data services. PDSN/HA 220 may include one or more network components to provide an interface between RNC 210 and data network 130. PDSN/HA 220 may provide functions, such as user authorization, setting up the data session and assigning an IP address to access terminal 102 for data service. PDSN/HA 220 may also provide functions to direct mobile terminated messages to the appropriate RAN 120 for delivery to access terminal 102.

AAA server 230 may include one or more server entities, or other types of computation or communication devices, that provide authentication, authorization, and accounting functions when devices, such as access terminal 102, attempt to set up a data session via data network 130.

CSCF server 240 may include one or more server entities, or other types of computation or communication devices, that may authenticate a device, such as access terminal 102, and/or track the location of the device for SMS message delivery.

As described in more detail below, implementations herein may use communication between AAA server 230 and CSCF server 240 to verify access terminal 102 and to obtain information of an IP addresses of access terminal 102 and an anchoring home agent (e.g., PDSN/HA 220) of data network 130. Access terminal 102, AAA server 230, CSCF server 240, and SMSC 150 are described in more detail with regard to FIGS. 3-8.

One access terminal 102, RNC 210, PDSN/HA 220, AAA server 230, CSCF server 240, and SMSC 150 have been illustrated in FIG. 2 for simplicity. In other implementations, network portion 200 may contain fewer, additional, different, or differently arranged components than depicted in FIG. 2. In still other implementations, one or more components of network portion 200 may perform one or more other tasks described as being performed by one or more other components of network portion 200.

Figure 3:
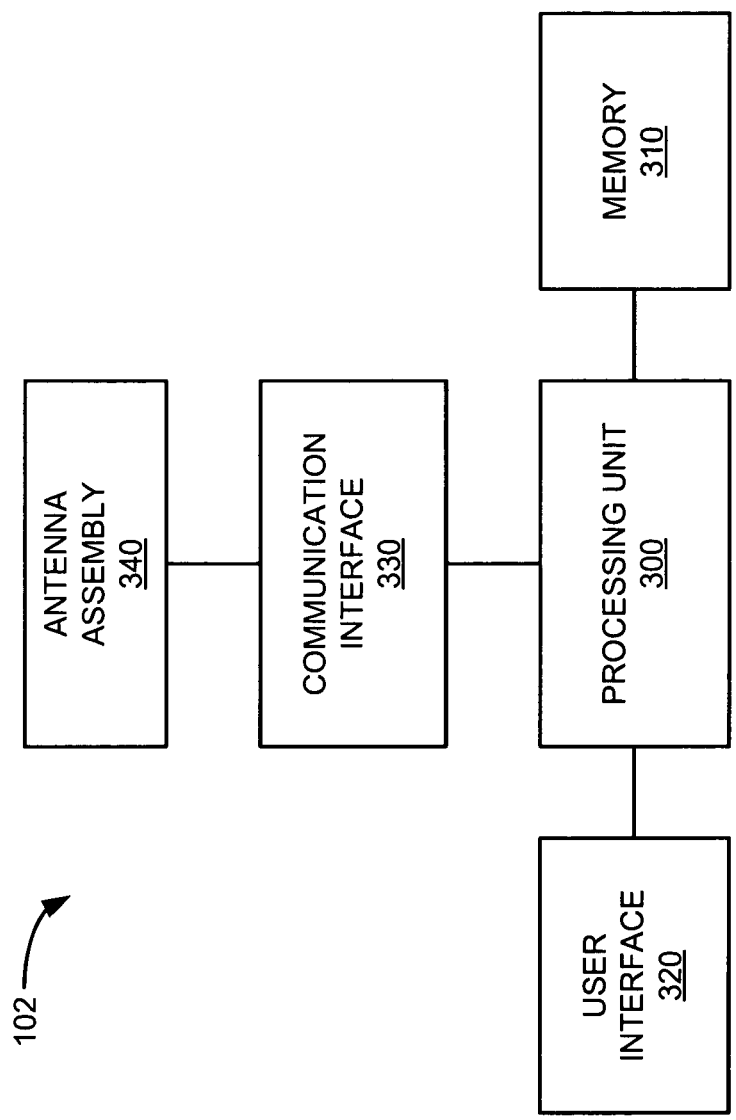
FIG. 3 is a diagram of exemplary components of the access terminal of FIG. 2.

FIG. 3 is a diagram of exemplary components of access terminal 102. As illustrated, access terminal 102 may include a processing unit 300, memory 310, a user interface 320, a communication interface 330, and/or an antenna assembly 340.

Processing unit 300 may include a processor, a microprocessor, an application specific integrated circuit (ASIC), a field programmable gate array (FPGA), or the like. Processing unit 300 may control operation of access terminal 102 and its components. In one implementation, processing unit 300 may control operation of components of access terminal 102 in a manner described herein.

Memory 310 may include a random access memory (RAM), a read-only memory (ROM), and/or another type of memory to store data and instructions that may be used by processing unit 300.

User interface 320 may include mechanisms for inputting information to access terminal 102 and/or for outputting information from access terminal 102. Examples of input and output mechanisms might include buttons (e.g., control buttons, keys of a keypad, a joystick, etc.) or a touch screen interface to permit data and control commands to be input into access terminal 102; a speaker to receive electrical signals and output audio signals; a microphone to receive audio signals and output electrical signals; and/or a display to output visual information (e.g., text input into access terminal 102).

Communication interface 330 may include, for example, a transmitter that may convert baseband signals from processing unit 300 to radio frequency (RF) signals and/or a receiver that may convert RF signals to baseband signals. Alternatively, communication interface 330 may include a transceiver to perform functions of both a transmitter and a receiver. Communication interface 330 may connect to antenna assembly 340 for transmission and/or reception of the RF signals.

Antenna assembly 340 may include one or more antennas to transmit and/or receive RF signals over the air. Antenna assembly 340 may, for example, receive RF signals from communication interface 330 and transmit them over the air, and receive RF signals over the air and provide them to communication interface 330. In one implementation, for example, communication interface 330 may communicate with a network and/or devices connected to a network (e.g., wireless carrier network 110).

As will be described in detail below, access terminal 102 may perform certain operations described herein in response to processing unit 300 executing software instructions of an application contained in a computer-readable medium, such as memory 310. A computer-readable medium may be defined as a physical or logical memory device. The software instructions may be read into memory 310 from another computer-readable medium or from another device via communication interface 330. The software instructions contained in memory 310 may cause processing unit 300 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows exemplary components of access terminal 102, in other implementations, access terminal 102 may contain fewer, additional, different, or differently arranged components than depicted in FIG. 3. In still other implementations, one or more components of access terminal 102 may perform one or more other tasks described as being performed by one or more other components of access terminal 102.

Figure 4:
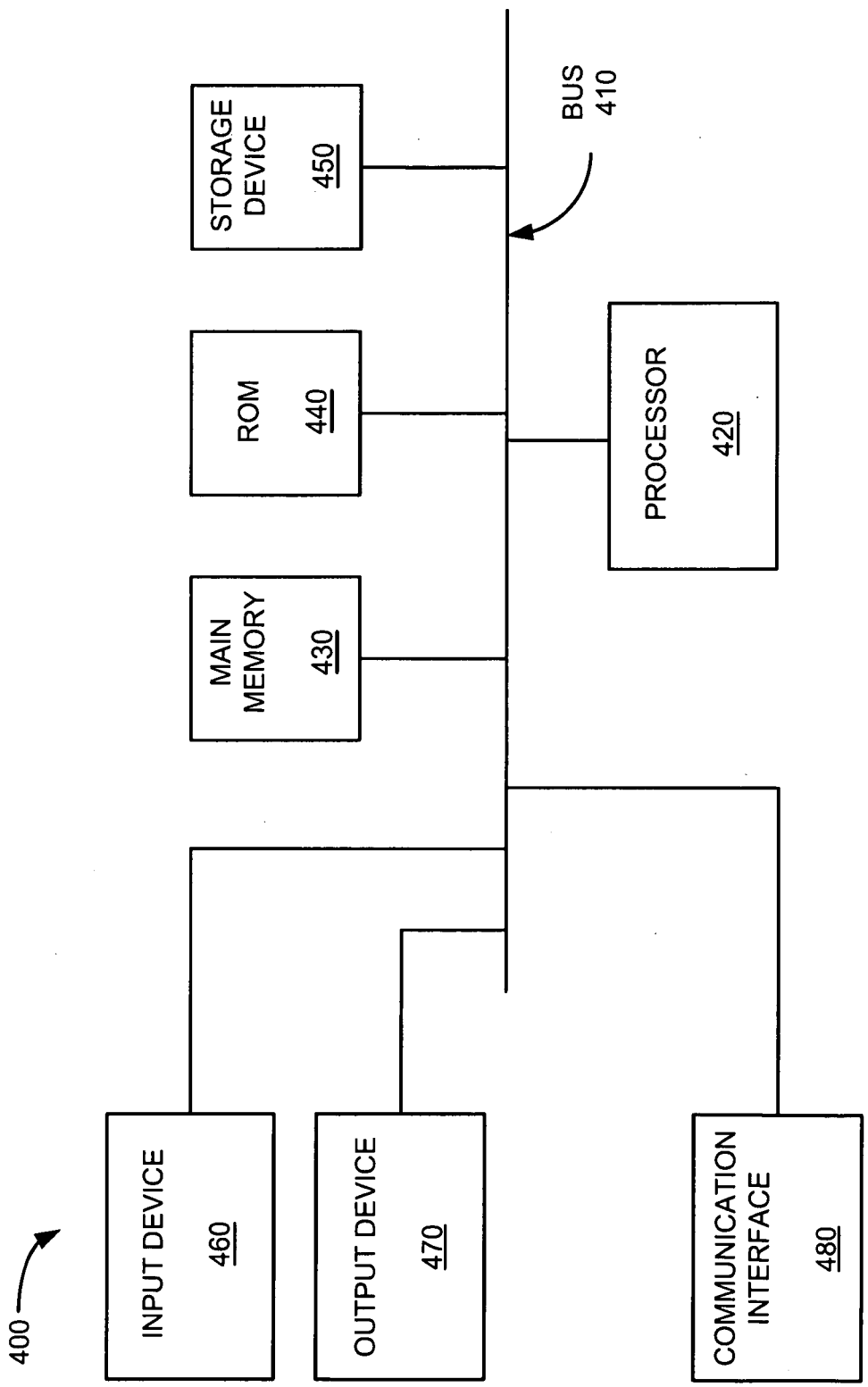
FIG. 4 is an exemplary diagram of a device that may correspond to any of the other device(s), short message service center (SMSC), radio network controller (RNC), packet data servicing node/home agent (PDSN/HA), authentication, authorization, and accounting (AAA) server, and call session control functions (CSCF) server of FIG. 2.

FIG. 4 is an exemplary diagram of a device 400 that may correspond to any of other device(s) 104, SMSC 150, RNC 210, PDSN/HA 220, AAA server 230, and CSCF server 240. As illustrated, device 400 may include a bus 410, a processor 420, a main memory 430, a ROM 440, a storage device 450, an input device 460, an output device 470, and a communication interface 480.

Bus 410 may include conductors or a pathway that permit communication among the components of device 400. Processor 420 may include a processor(s), a microprocessor(s), or processing logic that interprets and executes instructions. Main memory 430 may include a RAM or another type of dynamic storage device that stores information and instructions for execution by processor 420. ROM 440 may include a ROM device or another type of static storage device that stores static information and instructions for use by processor 420. Storage device 450 may include a magnetic and/or optical recording medium and its corresponding drive.

Input device 460 may include one or more mechanisms that permit a user to input information to device 400, such as a keyboard, a key pad, a button, a touch screen, a touch pad, a mouse, a pen, voice recognition and/or biometric mechanisms, etc. Output device 470 may include one or more mechanisms that output information to the user, including a display, a light emitting diode, a speaker, etc. Communication interface 480 may include any transceiver-like mechanism that enables device 400 to communicate with other devices and/or systems. For example, communication interface 480 may include mechanisms for communicating with another device or system via a network, such as wireless carrier network 110 and/or other network 160.

As described herein, device 400 may perform certain operations in response to processor 420 executing software instructions contained in a computer-readable medium, such as main memory 430. The software instructions may be read into main memory 430 from another computer-readable medium, such as storage device 450, or from another device via communication interface 480. The software instructions contained in main memory 430 may cause processor 420 to perform processes described herein. Alternatively, hardwired circuitry may be used in place of or in combination with software instructions to implement processes described herein. Thus, implementations described herein are not limited to any specific combination of hardware circuitry and software.

Although FIG. 4 shows exemplary components of device 400, in other implementations, device 400 may contain fewer, additional, different, or differently arranged components than depicted in FIG. 4. In still other implementations, one or more components of device 400 may perform one or more other tasks described as being performed by one or more other components of device 400.

Figure 5:
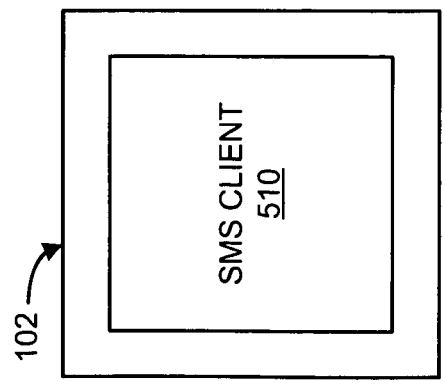
FIG. 5 provides a functional block diagram of the access terminal of FIG. 1.

FIG. 5 provides a functional block diagram of access terminal 102. As shown in FIG. 5, access terminal 102 may include an SMS client 510 to acquire a wireless data session when an SMS message is to be sent. SMS client 510 may also send and/or receive an SMS message via data network 130. SMS client 510 may further terminate the wireless data session after a particular period of no SMS activity to conserve network resources. SMS client 510 may also support SMS functionality for SMS over a voice network (e.g., voice network 140).

In an exemplary implementation, SMS client 510 may automatically determine which network (i.e., data network 130 or voice network 140) will be used to provide SMS for access terminal 102. For example, if access terminal 102 detects coverage from data network 130, SMS client 510 will instruct access terminal 102 to set up a data session when there is an SMS to be sent. SMS client 510 may then use SMS data network protocol to send and receive SMS over data network 130. If access terminal 102 cannot detect coverage of data network 130, SMS client 510 may select voice network 140 to provide SMS.

In one implementation, SMS client 510 may include a user interface for access terminal 102 that is substantially identical for SMS over data network 130 and for SMS over voice network 140. As a result, the particular network used to transmit a SMS message may be transparent to a user of the access terminal 102. Additionally, SMS client 510 may set a session timer (such as a PPP session timer), track SMS activity, and terminate a data session when the timer expires and no other data application is active.

SMS client 510 may convert outgoing SMS messages from a voice network protocol to a SMS data network protocol (such as SIP) and convert incoming SMS messages from the SMS data network protocol to the voice network protocol. In order to preserve the SMS parameters used in the ANSI-41 protocol to facilitate a fallback to SMS over voice network 140, the SMS voice network protocol (e.g., the ANSI IS-637 Transport Layer) may be encapsulated in the SMS data network protocol message. The encapsulated SMS voice network format may be embedded in the body (e.g., payload) of the data network protocol message in binary format. Thus, all SMS functionalities delivered to access terminal 102 can be preserved.

Figure 6:
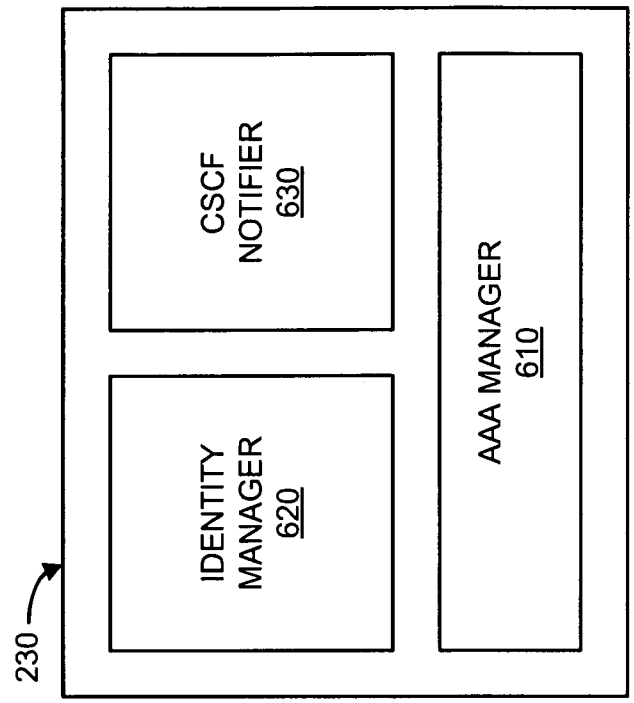
FIG. 6 provides a functional block diagram of the AAA server of FIG. 2.

FIG. 6 provides a functional block diagram of AAA server 230. As shown in FIG. 6, AAA server 230 may include AAA manger 610, identity manager 620, and CSCF notifier 630.

AAA manager 610 may interface with the PDSN/HA 220 to provide authentication, authorization and accounting functions when access terminal 102 is attempting to set up a data session. AAA manager 610 may track access terminal 102 activity and may save pertinent runtime data of access terminal 102.

Identity manager 620 may retrieve and store identity information for access terminal 102. For example, when access terminal 102 sets up a data session successfully, identity manager 620 of AAA server 230 may save the Mobile IP address of access terminal 102, the IP address of the anchoring HA (e.g., PDSN/HA 220), the mobile directory number (MDN) of access terminal 102, the mobile identification number (MIN) of access terminal 102, and/or the network access identifier (NAI) of a user of access terminal 102. In one implementation, identity manager 620 may also store other data related to other functions of AAA server 230.

CSCF notifier 630 may exchange messages with CSCF server 240 to provide information regarding a wireless session of access terminal 102. For example, when access terminal 102 sets up the wireless data session successfully, CSCF notifier 630 may send a notification to the designated CSCF server (e.g., CSCF server 240) for access terminal 102. The notification may include the Mobile IP address for access terminal 102, the IP address for PDSN/HA 220, the MIN of access terminal 102, and/or MDN for access terminal 102. The notification may provide the required information to CSCF server 240 for validation of access terminal 102 when CSCF server 240 receives an SMS message for processing and routing to the appropriate SMSC (e.g., SMSC 150). As another example, when the wireless data session of access terminal 102 is terminated, CSCF notifier 630 may send a notification to the designated CSCF server (e.g., CSCF server 240) informing of the new access terminal 102 session status. The notification may allow CSCF server 240 to do proper validation when CSCF server 240 receives an SMS message for processing and routing.

FIG. 7 provides a functional block diagram of CSCF server 240. As shown in FIG. 7, CSCF server 240 may include access terminal (AT) authenticator 710 and AT location tracker 720. AT authenticator 710 may provide functions to authenticate access terminal 102 for SMS. AT location tracker 720 may provide functions to track the location of access terminal 102 for SMS message delivery. CSCF server 240 may provide these functions for access terminal 102 working in conjunction with the AAA server 230. For example, CSCF server 240 may receive notifications from AAA server 230 regarding a PPP (Point to Point Protocol) session status set up by access terminal 102. Based on the notification data, CSCF server 240 may be able to authenticate any SMS message, in SIP, received from PDSN/HA 220 and track the location of access terminal 102 for SMS delivery when receiving the request from SMSC 150.

As a further example, when access terminal 102 terminates the PPP session, CSCF server 240 may receive a notification from AAA server 230 with all the PPP session data cleared for access terminal 102. Any SMS message from PDSN/HA 220 for access terminal 102 can be rejected. Likewise any SMS message received from SMSC 150 intended for access terminal 102 can be rejected. SMSC 150 may then attempt to deliver the SMS via voice network 140.

FIG. 8 provides a functional block diagram of SMSC 150. As shown in FIG. 8, SMSC 150 may include SIP manager 810, SS7 manager 820, and controller 830. SIP manager 810, SS7 manager 820, and controller 830 may enable SMSC 150 to send/receive SMS messages over both data network 130 and voice network 140. For example, SIP manager 810 may communicate with CSCF server 240 to provide SMS over data network 130. SIP manager 810 may receive MO (Mobile Originated) SMS messages from CSCF server 240 using an appropriate protocol and may process the message accordingly. When SIP manager 810 has a message to be delivered to access terminal 102, SIP manager 810 may send the message to CSCF server 240 for delivery. As another example, SS7 manager 820 may send/receive SMS messages using known protocols for voice network 140, such as SS7 protocols.

Controller 830 may determine when to deliver an SMS message via voice network 140 or via data network 130. For example, if access terminal 102 cannot set up a data session in data network 130, or if SMS delivery fails via data network 130, controller 130 can then direct SS7 manager 820 to send the SMS message via voice network 140.

Figure 9:
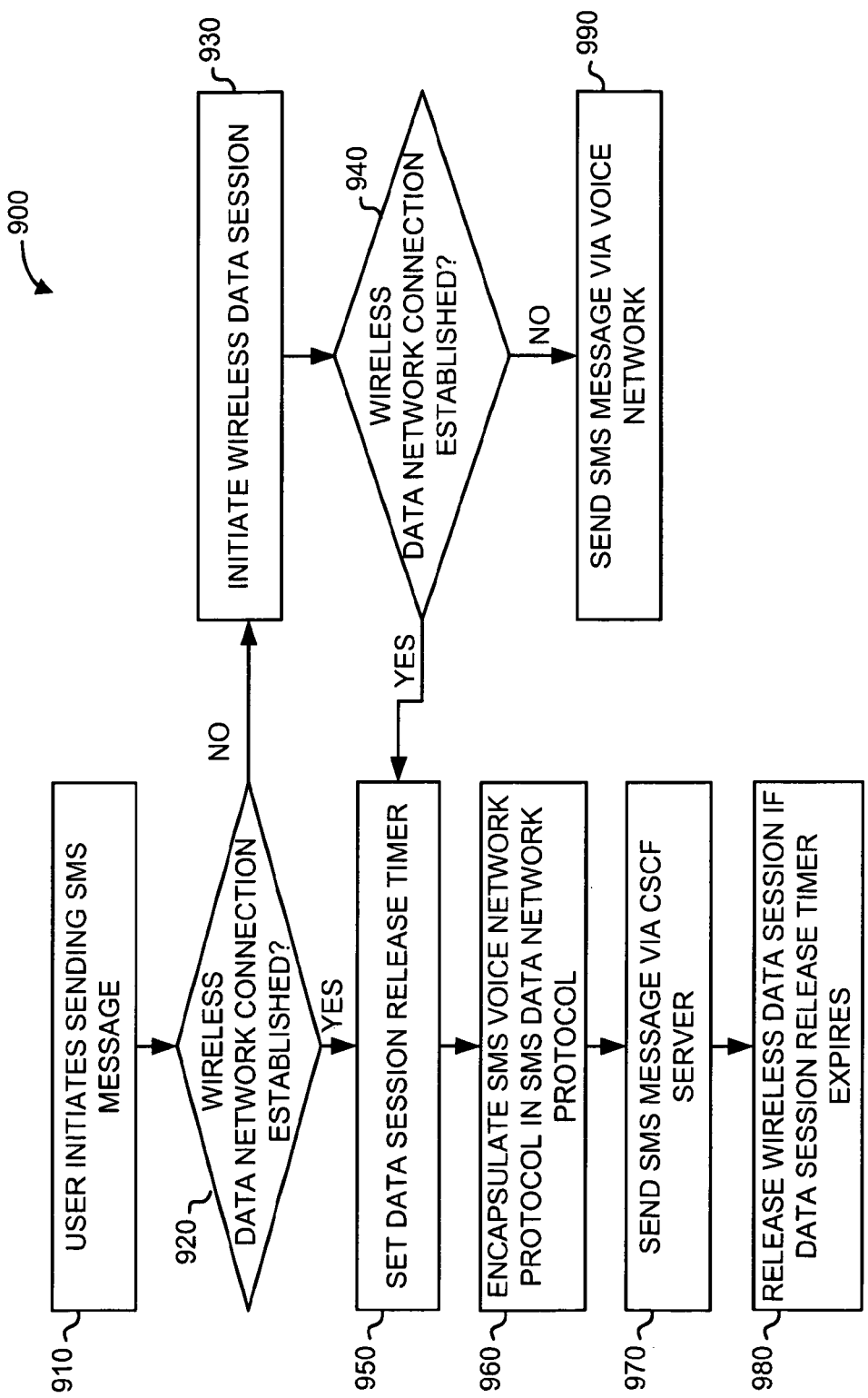
FIG. 9 provides a flow chart of an exemplary process that may be performed by a device in sending SMS messages over a wireless data network according to an implementation.

FIG. 9 provides a flow chart of exemplary process 900 that may be performed by a device in sending SMS messages over a wireless data network. In an exemplary implementation, process 900 may be performed by an access terminal (such as access terminal 102) running an SMS client application.

As shown in FIG. 9, process 900 may begin with a user of an access terminal initiating the sending of an SMS message (block 910). For example, a user may use the SMS client user interface of access terminal 102 to type an SMS message and send the message to a user of another SMS-enabled device (or, in some instances, to a user of a non-SMS-enabled device).

It may be determined if a wireless data network connection is already established (block 920). For example, access terminal 102 may check if a wireless data session is set up with data network 130. If no wireless data network connection has been established (block 920—NO), then the access terminal may initiate a wireless data session (block 930). For example, access terminal 102 may establish a PPP data session with PDSN/HA 220 once wireless data network radio connection is established with RNC 210. During the set up of the PPP data session, access terminal 102 may be authenticated by components of data network 130.

After a wireless data session is initiated, it may again be determined if a wireless data network connection is established (block 940). For example, access terminal 102 will again seek confirmation that the requested PPP data session with PDSN/HA 220 has been established. When a wireless data session is established successfully, the access terminal 102 may send and receive packet data with any other IP addresses in data network 130.

If a wireless data network connection has been established (block 940—YES) or was already established (block 920—YES), then the access terminal may set a data session release timer (block 950). For example, access terminal 102 may set a PPP release timer after receiving confirmation that a data session has been established with PDSN/HA 220.

A SMS voice network protocol message may be encapsulated in a SMS data network protocol message (block 960). For example, access terminal 102 may encapsulate the IS-637 transport layer of the SMS message in the message body of a SMS data network protocol message such as SIP. The encapsulated SMS voice network protocol message may be embedded in the body (e.g., payload) of the data network protocol message in binary format. The header of the SMS data network protocol message may include information identifying the message as a SMS message and/or information identifying an intended recipient of the SMS message.

The SMS message may be sent via a CSCF server (block 970). For example, access terminal 102 may send the SMS message (the SMS data network protocol message) via data network 130 to CSCF server 240. CSCF server 240 may then process the SMS message for delivery to the intended recipient device.

The wireless data session may be released if the data session release timer expires (block 980). For example, access terminal 102 may release the PPP data session with PDSN/HA 220 if no SMS activity occurs within the timer limit (e.g., 300 seconds). In one implementation, the data session release timer may be reset when SMS activity occurs within the timer limit. In other implementations, the data session release timer may not be reset. In still other implementations, resetting the data session release timer may not be based particularly on SMS activity.

Returning to block 940, if a wireless data network connection has not been established after an attempt to initiate a wireless data session (block 940—NO), then the SMS message may be sent to an MSC. For example, access terminal 102 may use voice network 140 to send the SMS message using a standard voice network protocol (e.g., ANSI-41).

Figure 10:
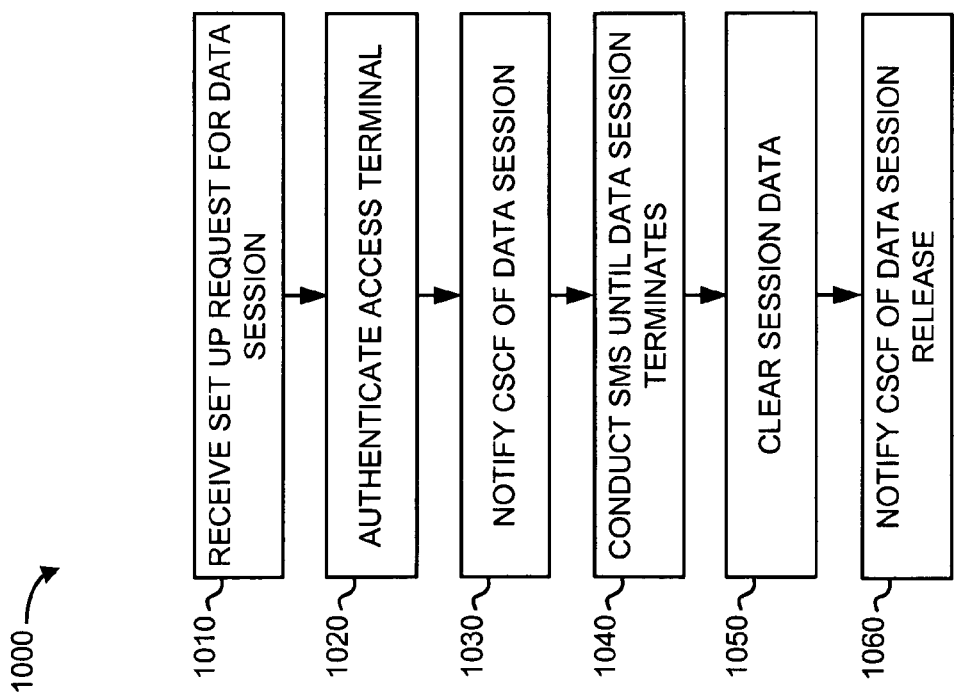
FIG. 10 provides a flow chart of exemplary operations that may be performed in establishing and terminating a wireless data session for SMS.

FIG. 10 provides a flow chart of exemplary operations 1000 that may be performed in establishing and terminating a wireless data session for SMS. Operations 1000 may be performed by components of a wireless carrier network, such as wireless carrier network 110. In one implementation, the operations may be performed by hardware or a combination of hardware and software components of a SMSC (such as SMSC 150), a CSCF server (such as CSCF server 240), a AAA server (such as AAA server 230), and/or a home agent (such as PDSN/HA 220).

As shown in FIG. 10, operations may begin when a set up request for a wireless data session is received (block 1010). For example, PDSN/HA 220 may receive, from access terminal 102, a request to establish a PPP data session.

The access terminal may be authenticated (block 1020). For example, PDSN/HA 220 may communicate with AAA server 230 to authenticate access terminal 102. An IP address may be assigned to access terminal 102 by PDSN/HA 220 after authentication. Mobile IP protocol may be used. When the data session is established successfully, data network 130 can be ready to send packet data to and receive packet data from access terminal 102.

The CSCF may be notified of the data session (block 1030). For example, after the wireless data session has been established, AAA server 230 may send a notification to CSCF server 240 providing data to CSCF server 240 for call session control of access terminal 102. The notification may include the Mobile IP address for access terminal 102, the IP address for PDSN/HA 220, the MIN of access terminal 102, and/or the MDN for access terminal 102. The notification may allow CSCF server 240 to perform proper validation on access terminal 102.

SMS activities may be conducted until the data session terminates (block 1040). For example, once the SMS wireless data session is established, CSCF server 240 may send SMS messages from SMSC 150 to access terminal 102, and SMS messages to SMSC 150 from access terminal 102. The PPP data session may continue until the session is terminated by either access terminal 102 or a component of data network 130.

Session data may be cleared (block 1050). For example, when access terminal 102 or a component of data network 130 terminates the wireless data session, PDSN/HA 220 may communicate with AAA server 230 to clear all session data for access terminal 102.

The CSCF may be notified of the data session release (block 1060). For example, once the session is terminated, AAA server 230 may send a notification to CSCF server 240 clearing the session data of access terminal 102. CSCF server 240 may reject any subsequent SMS request to the sender of the SMS request because validation fails for this access terminal 102 using the wireless data session. This rejection can apply to both mobile originated (MO) SMS messages and mobile terminated (MT) SMS messages using SIP.

Figure 11:
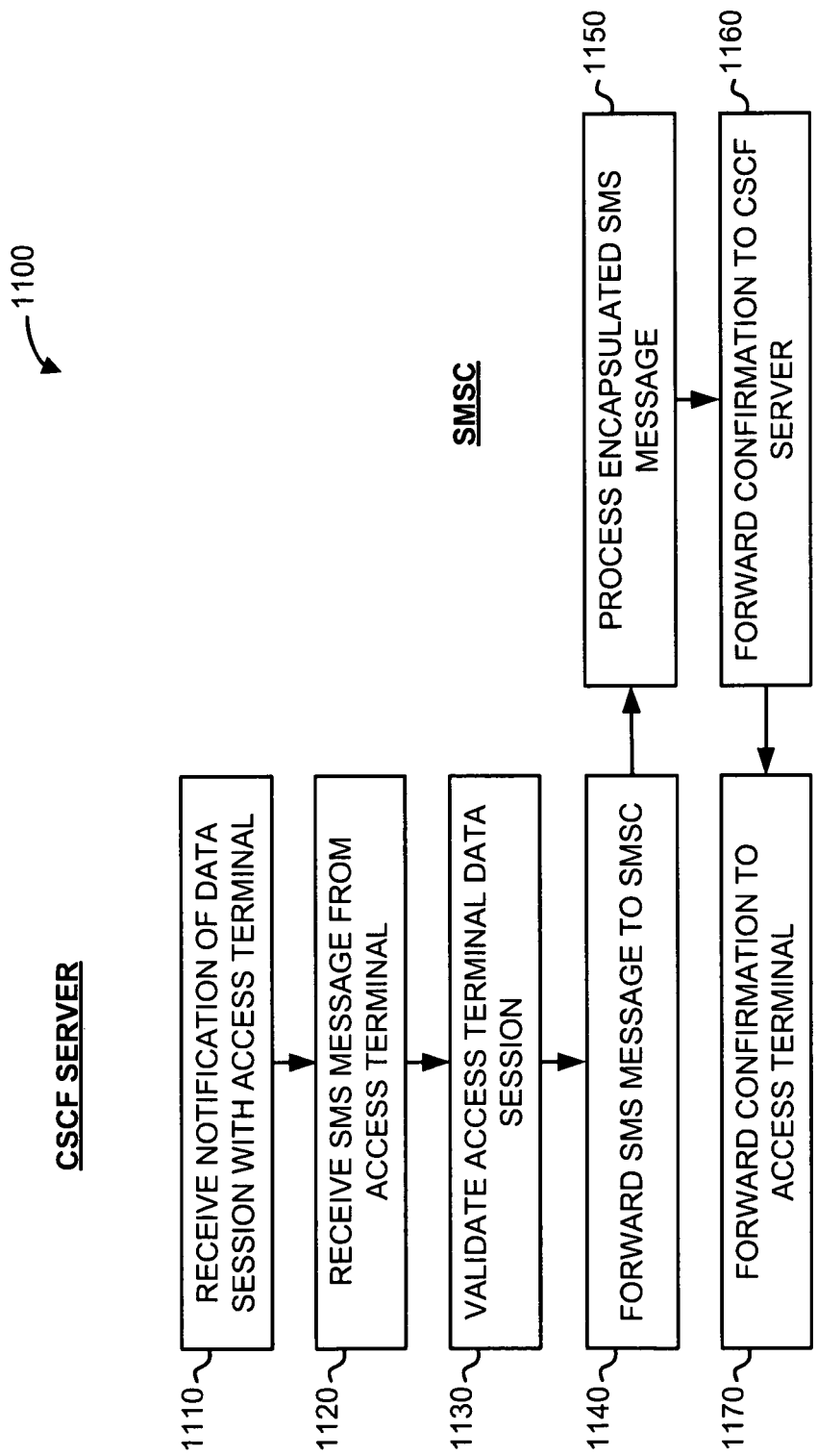
FIG. 11 provides a flow chart of exemplary operations that may be performed in processing an SMS message from an access terminal through a wireless data network.

FIG. 11 provides a flow chart of exemplary operations 1100 that may be performed in processing an SMS message from an access terminal (e.g., an MO SMS message) through a wireless data network. Operations 1100 may be performed by components of a wireless carrier network, such as wireless carrier network 110. In one implementation, the operations may be performed by hardware or a combination of hardware and software components of a CSCF server (such as CSCF server 240) and/or a SMSC (such as SMSC 150).

As shown in FIG. 11, operations may begin with the receiving of a notification of a data session with an access terminal (block 1110). For example, CSCF server 240 may receive a notification from an AAA server, such as AAA server 230, that access terminal 102 has established a PPP session with a component (e.g., PDSN/HA 220) of the wireless data network (e.g., data network 130). The notification may include the Mobile IP address for access terminal 102, the IP address for PDSN/HA 220, the MIN of access terminal 102, and/or the MDN for access terminal 102.

An SMS message may be received from the access terminal (block 1120). For example, CSCF server 240 may receive an SMS message over data network 130. The SMS message may use an SMS data network protocol. In an exemplary implementation, the SMS message may use an application layer protocol, such as SIP. Specifically, the MESSAGE method in SIP may be used to carry the SMS message. The SMS message may be encapsulated in an IS-637 transport layer and embedded in the SIP message content in binary format.

The access terminal data session may be validated (block 1130). For example, CSCF server 240 may validate the access terminal data session. CSCF server 240 may rely on data previously received from AAA server 230 to validate the data session.

The SMS message may be forwarded to an SMSC (block 1140). For example, after validating the access terminal data session, CSCF server 240 may determine which SMSC should process the message and forward the message to the appropriate SMSC.

The encapsulated SMS message may be processed (block 1150). For example, SMSC 150 may receive the message from CSCF server 240. SMSC may extract the encapsulated IS-637 transport layer from the SIP MESSAGE content to identify the SMS message and decide how to deliver the SMS message to the intended recipient.

A confirmation may be forwarded to the CSCF server (block 1160). For example, SMSC 150 may send back a positive response message to CSCF server 240. In one implementation, the confirmation may be in the form of a SIP response.

The confirmation may be forwarded to the access terminal (block 1170). For example, CSCF server 240 may forward the response message back to access terminal 102. The response may signify to access terminal 102 that the SMS message has been received by the network for final delivery to the intended recipient.

Figure 12:
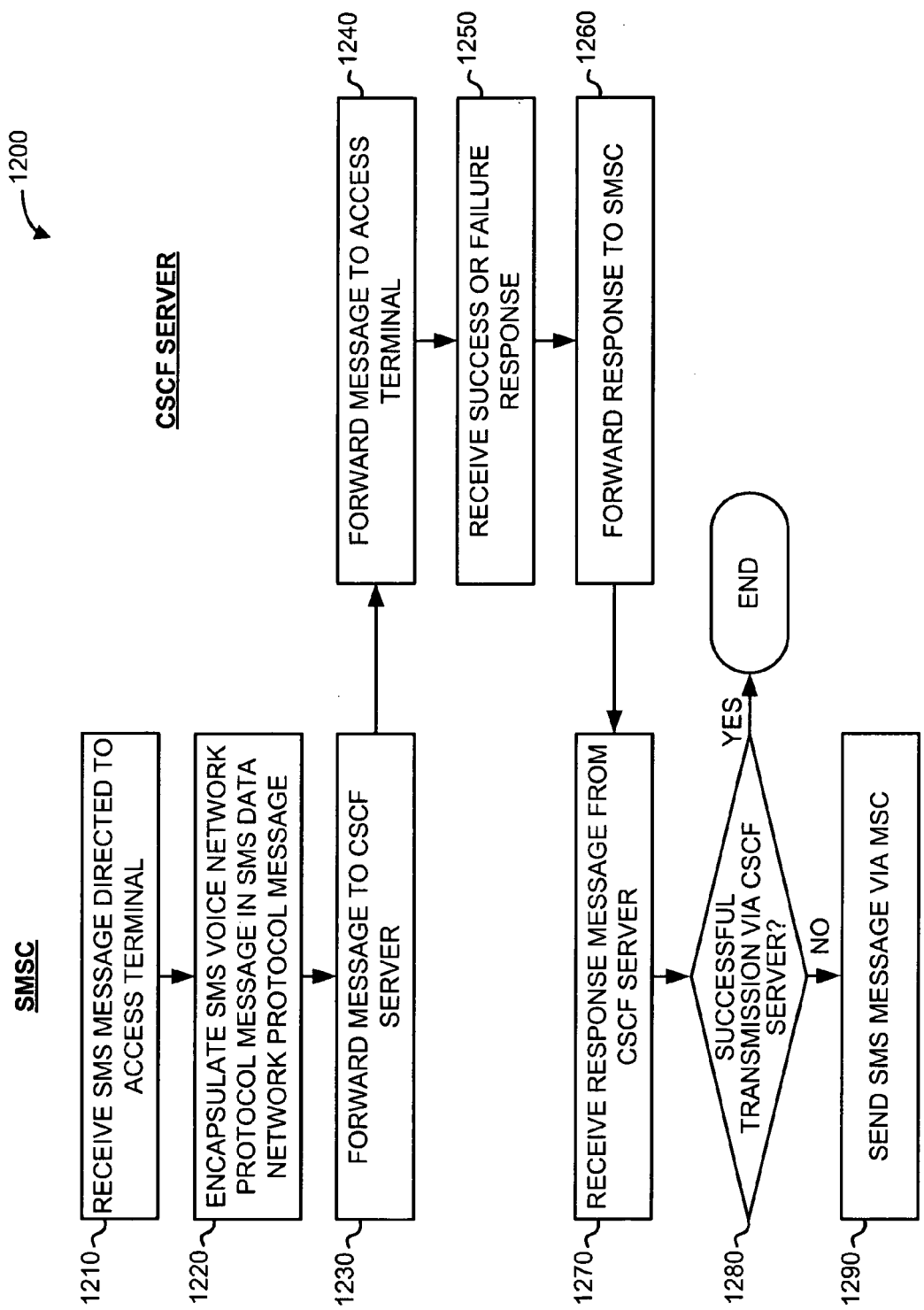
FIG. 12 provides a flow chart of exemplary operations that may be performed in processing an SMS message forwarded towards an access terminal through a wireless data network.

FIG. 12 provides a flow chart of exemplary operations 1200 that may be performed in processing an SMS message forwarded towards an access terminal (e.g., an MT SMS message) through a wireless data network. Operations 1200 may be performed by components of a wireless carrier network, such as wireless carrier network 110. In one implementation, the operations may be performed by hardware or a combination of hardware and software components of a CSCF server (such as CSCF server 240) and a SMSC (such as SMSC 150).

As shown in FIG. 12, operations may begin with the receiving of an SMS message directed to an access terminal (block 1210). For example, SMSC 150 may receive an SMS message from an external network (e.g., other network 160 of FIG. 1). The message may be intended for the user of an access terminal (e.g., access terminal 102) associated with wireless carrier network 110. The SMS message may be a SMS voice network protocol message.

The SMS voice network protocol message may be encapsulated in a SMS data network protocol message (block 1220). For example, SMSC 150 may encapsulate the IS-637 transport layer of the SMS message in the message body of the SMS data network protocol message, such as the SIP MESSAGE. In one implementation, the encapsulated SMS voice network message may be embedded in the body (e.g., payload) of the data network protocol message in binary format.

The message may be forwarded to the CSCF server (block 1230). For example, SMSC 150 may forward the SMS data network protocol message (including the encapsulated SMS voice network message) to CSCF server 240. The message may be forwarded to the access terminal (block 1240). For example, CSCF server 240 may forward the SMS data network protocol message (including the encapsulated SMS voice network message) message to access terminal 102 using the SIP protocol.

A success or failure response may be received (block 1250). For example, CSCF server 240 may receive a response message, such as a SIP response, from access terminal 102 indicating the SMS message was received by access terminal 102. Alternatively, CSCF server 240 may receive a response message from PDSN/HA 220 indicating the SMS message was unable to be delivered to access terminal 102. In another implementation, CSCF server 240 may rely on data previously received from an AAA server, such as AAA server 230, to determine if there is a valid data session for transmitting the message to access terminal 102. The response may be forwarded to the SMSC (block 1260). For example, CSCF 240 may forward the response from access terminal 102, PDSN/HA 220, or AAA server 230 to SMSC 150.

Based on the message forwarded from CSCF server 1270, it may be determined if there was a successful transmission of the SMS message via the CSCF server (block 1280). If it is determined that there was not a successful transmission of the SMS message via the CSCF server (block 1280—NO), then the original SMS message from the external network may be sent to the intended recipient via an MSC (block 1290). For example, SMSC 150 may forward the SMS message to MSC 142 over voice network 140 using SMS voice network protocol. MSC 142 may direct the SMS message to access terminal 102. If it is determined that there was a successful transmission of the SMS message vial the CSCF server (block 1280—YES), then the operations may end.

Figure 13:
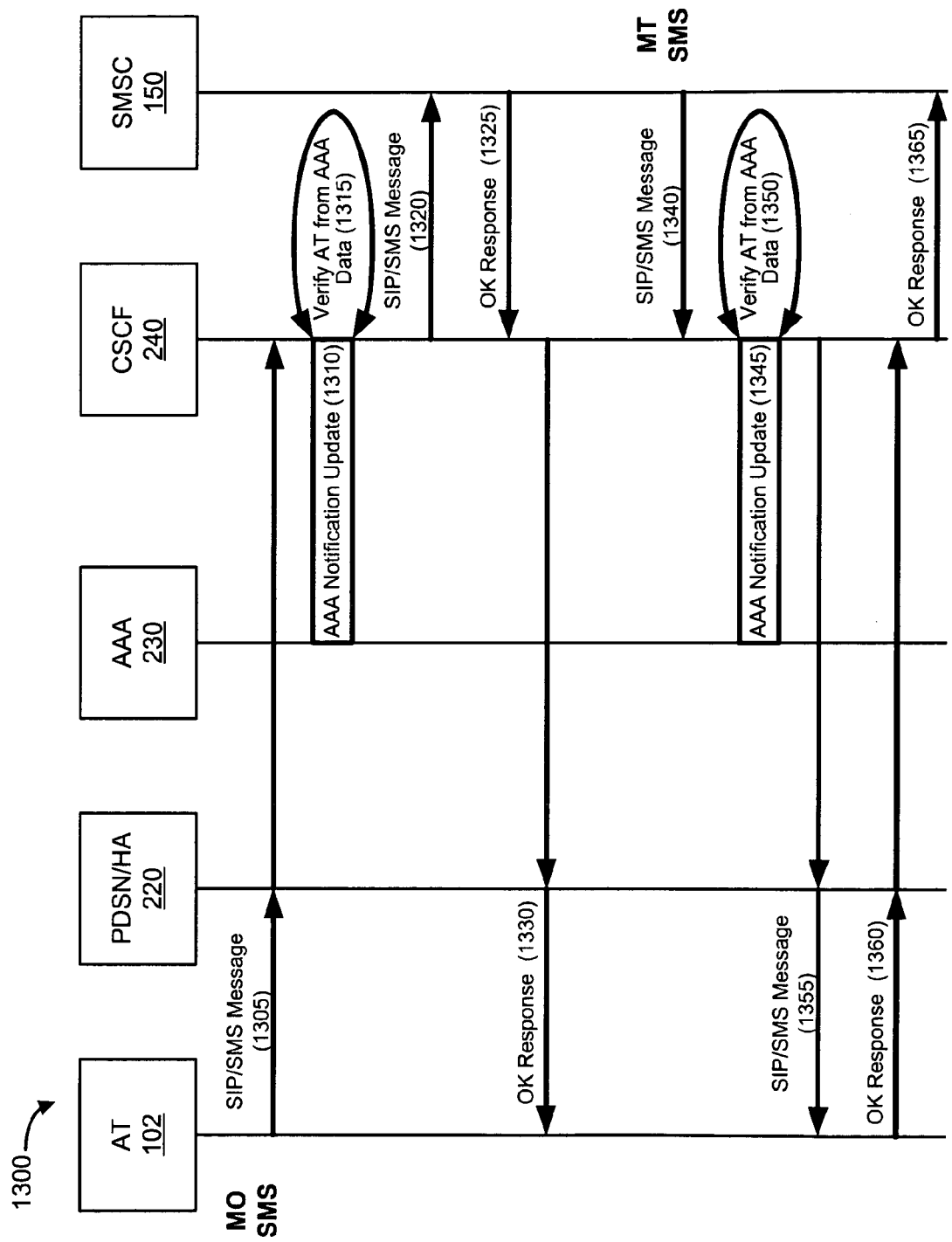
FIG. 13 depicts a diagram of an exemplary call flow capable of being performed on the exemplary portion of the network illustrated in FIG. 2.

FIG. 13 depicts a diagram of an exemplary call flow 1300 capable of being performed on the exemplary portion of the network illustrated in FIG. 2. Exemplary call flow 1300 is described in the context of a 1x Evolution-Data Optimized (1xEVDO) Packet Data Network and Session Initiated Protocol (SIP). For discussion of FIG. 13, assume access terminal 102 has set up a PPP data session and is ready to send and receive SMS messages in SIP via the 1xEVDO network. FIG. 13 shows the call flow for Mobile-Originated (MO) SMS (lines 1305-1330) and Message-Terminated (MT) SMS (lines 1340-1365) with a wireless packet data network.

A SMS client (such as SMS client 510 of FIG. 5) of access terminal 102 creates an SMS message in IS-637 format and encapsulates the transport layer in the body of the SIP message. The SMS client then sends the SIP message to CSCF server 240 via an RNC (not shown in FIG. 13) and PDSN/HA 220 (line 1305).

AAA server 230 provides a notification and/or a notification update to CSCF server 240 regarding access terminal 102 activity (line 1310). The notification and/or notification update may be provided to CFSC 240 asynchronously with respect to other message sending or receiving events. CSCF 240 validates access terminal 102 and access terminal's 102 wireless data session status based on the received AAA server 230 data (line 1315). Note that, at any time, the PPP data session can be terminated. When the PPP data session is terminated, AAA server 230 may send a notification to CSCF server 240 informing CSCF server 240 of the new wireless data session status of access terminal 102. If validation is successful, CSCF server 240 determines the appropriate SMSC (e.g., SMSC 150) from its provisioning data and forwards the SIP message to the appropriate SMSC (line 1320).

SMSC 150 receives the SIP message from CSCF server 240, extracts the encapsulated IS-637 transport layer, processes it, and decides how to deliver the SMS message to the intended destination. SMSC 150 also sends back a positive response message (e.g., SIP 200 OK) to CSCF server 240 (line 1325). CSCF server 240 forwards the response message back to access terminal 102 (line 1330). The response message indicates to access terminal 102 that the message has been received by the network for final delivery.

When SMSC 150 has a SMS message to be delivered to access terminal 102, SMSC 150 sends the SIP message, with an encapsulated IS-637 transport layer in the payload, to CSCF server 240 (line 1340). AAA server 230 provides a notification and/or a notification update to CSCF server 240 regarding access terminal 102 activity (line 1345). The notification and/or notification update may be provided to CFSC 240 asynchronously with respect to other message sending or receiving events. The notification may include the Mobile IP address for access terminal 102, the IP address for PDSN/HA 220, the MIN of access terminal 102, and/or the MDN for access terminal 102. CSCF 240 validates access terminal 102 and access terminal's 102 wireless data session status based on the received AAA server 230 data (line 1350).

If validation is successful, CSCF server 240 uses the MIP address of access terminal 102 and the IP address of the anchoring HA (e.g., PDSN/HA 220) from the AAA server 230 data and routes the SMS message to the anchoring HA (line 1355).

The SMS client (e.g., SMS client 510) on access terminal 102 receives the SIP message, extracts the encapsulated IS-637 transport layer from the SIP message content, and processes the SMS message. It then returns a positive response (e.g., SIP 200 OK) message to CSCF server 240 via the RNC and PDSN/HA 220 (line 1360).

CSCF server 240 forwards the positive response message to SMSC 150 (line 1365). This completes the delivery of a mobile terminated SMS via the wireless packet data network.

Methods and/or systems described herein may provide for a delivery of SMS over a wireless data network. In some implementations, both mobile originated (MO) SMS and mobile terminated (MT) SMS may be supported. Access terminals may be equipped with an SMS client application to receive and send SMS messages formatted for delivery over either a wireless packet data network or a voice network.

Similarly, SMSCs may be equipped to receive and send SMS messages formatted for delivery over either a wireless packet data network or a voice network. The access terminals and the SMSCs may select which network to use for SMS delivery based on, for example, network availability.

The foregoing description provides illustration and description, but is not intended to be exhaustive or to limit the embodiments to the precise form disclosed. Modifications and variations are possible in light of the above teachings or may be acquired from practice of systems and methods disclosed herein.

Also, while series of blocks and lines have been described with regard to FIGS. 9-13, the order of the blocks and lines may differ in other implementations. Further, non-dependent blocks and/or lines may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain implementations described herein may be implemented as "logic" that performs one or more functions. This logic may include hardware, such as a processor, microprocessor, an application specific integrated circuit or a field programmable gate array; or a combination of hardware and software.

It should be emphasized that the term "comprises" and/or "comprising" when used in this specification is taken to specify the presence of stated features, integers, steps, or components, but does not preclude the presence or addition of one or more other features, integers, steps, components, or groups thereof.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

What is claimed is:

1. A method comprising:
   receiving, by one or more devices, a short message service (SMS) message formatted for a voice network;
   determining, by the one or more devices and at a first time, if a wireless data network connection is established;
   establishing, by the one or more devices and based on receiving the SMS message and determining that the wireless data network connection is not established, a wireless data session with a wireless data network;
   verifying, by the one or more devices and at a second time, that the wireless data network connection is established, based on establishing the wireless data session, the second time occurring after the first time;
   encapsulating, by the one or more devices and based on verifying that the wireless data network connection is established, the received SMS message in a data message to form a data SMS message for transmission over the wireless data network; and
   transmitting, by the one or more devices, the data SMS message using the wireless data network.

2. The method of claim 1, where, when encapsulating the received SMS message, the method includes:
   embedding the received SMS message into a payload of the data message to form the data SMS message.

3. The method of claim 1, further comprising:
   setting a data session release timer after establishing the wireless data session; and
   releasing the wireless data session when the data session release timer expires.

4. The method of claim 3, where the data session release timer is reset based on SMS activity over the wireless data network.

5. The method of claim 1, where the data message is a session initiated protocol (SIP) message.

6. The method of claim 1, further comprising:
   receiving the transmitted data SMS message at a service center; and
   sending, by the service center and over the wireless data network, a response including information that indicates that the data SMS message was received by the service center.

7. The method of claim 1, further comprising:
   detecting termination of the wireless data session; and
   clearing, based on detecting termination, information related to the wireless data session.

8. A system comprising:
   one or more network devices to:
   receive a short message service (SMS) message, formatted for a voice network, intended for an access terminal,
   embed the SMS message into a data message,
   determine, at a first time, whether a data session exists with the access terminal, the data session occurring over a data network,
   establish, based on receiving the SMS message and determining that the data session does not exist, a wireless data session with a wireless data network,
   verify, at a second time and based on establishing the wireless data session, if the data session exists with the access terminal,
   the second time occurring after the first time, and
   selectively transmit the data message,
      the one or more networks devices, when selectively transmitting the data message, being to:
      transmit, based on verifying that the data session exists, the data message to the access terminal via the data network, or
      transmit, based on verifying that the data session does not exist, the data message via the voice network.

9. The system of claim 8, where the one or more network devices are further to:
   validate the data session for the access terminal.

10. The system of claim 8, where the data message is a session initiation protocol (SIP) message.

11. The system of claim 10, where the SMS message is inserted into a payload of the SIP message in a binary format.

12. The system of claim 8, where the one or more network devices are further to:
   detect termination of the data session; and
   clear, based on detecting termination, information related to the data session.

13. The system of claim 8, where the one or more network devices are further to:
set a data session release timer after establishing the data session; and
release the data session when the data session release timer expires.

14. A non-transitory computer-readable medium storing instructions, the instructions comprising:
one or more instructions which, when executed by at least one processor, cause the at least one processor to receive a short message service (SMS) message, from an access terminal, via a data network within a wireless carrier network,
the SMS message being formatted for a voice network within the wireless carrier network;
one or more instructions which, when executed by the at least one processor, cause the at least one processor to determine, at a first time, if a wireless data network connection is established;
one or more instructions which, when executed by the at least one processor, cause the at least one processor to establish, based on receiving the SMS message and determining that the wireless data network connection is not established, a wireless data session with a wireless data network;
one or more instructions which, when executed by the at least one processor, cause the at least one processor to verify, at a second time and based on establishing the wireless data session, that the wireless data network connection is established,
the first time occurring before the second time;
one or more instructions which, when executed by the at least one processor, cause the at least one processor to encapsulate, based on verifying that the wireless data network connection is established, the received SMS message in a data message to form a data SMS message for transmission over the wireless data network; and
one or more instructions which, when executed by the at least one processor, cause the at least one processor to transmit the data SMS message, using the wireless data network, to an intended recipient device.

15. The non-transitory computer-readable medium of claim 14, where
the SMS message includes an IS-637 Transport Layer message, and
the instructions further comprise:
one or more instructions to embed the IS-637 Transport Layer message into a body of the data SMS message in binary format.

16. The non-transitory computer-readable medium of claim 14, where the one or more instructions to encapsulate the received SMS message include:
one or more instructions to embed the received SMS message into a payload of the data message to form the data SMS message.

17. The non-transitory computer-readable medium of claim 14, where the instructions further comprise:
one or more instructions to set a data session release timer after establishing the wireless data session; and
one or more instructions to release the wireless data session when the data session release timer expires.

18. A method comprising:
receiving, by one or more devices, a short message service (SMS) message formatted for a voice network;
determining, by the one or more devices and at a first time, if a wireless data network connection is established;
establishing, by the one or more devices and based on determining that the wireless data network connection is not established, a wireless data session with a wireless data network;
verifying, by the one or more devices and at a second time, if the wireless data network connection is established, based on establishing the wireless data session,
the first time occurring before the second time;
encapsulating, by the one or more devices and based on determining that the wireless data network connection is established at the second time, the received SMS message in a data message to form a data SMS message for transmission over the wireless data network; and
selectively transmitting, by the one or more devices, the data SMS message,
the selectively transmitting the data SMS message including:
transmitting, by the one or more devices and based on verifying that the wireless network connection is established, the data SMS message using the wireless data network; or
transmitting, by the one or more devices and based on verifying that a wireless data network connection is not established at the second time, the data SMS message using the voice network.

19. The method of claim 18, where, when encapsulating the received SMS message, the method includes:
embedding the received SMS message into a payload of the data message to form the data SMS message.

20. The method of claim 18, further comprising:
setting a data session release timer after establishing the wireless data session; and
releasing the wireless data session when the data session release timer expires.

21. The method of claim 20, where the data session release timer is reset based on SMS activity over the wireless data network.

22. The method of claim 18, where the data message is a session initiated protocol (SIP) message.

* * * * *